Patented Sept. 20, 1932

1,877,991

UNITED STATES PATENT OFFICE

ERWIN SCHWENK, OF BERLIN-NEU WESTEND, AND HANS JORDAN, OF BERLIN-STEGLITZ, GERMANY, ASSIGNORS TO SCHERING-KAHLBAUM A. G., OF BERLIN, GERMANY

PRODUCTION OF HYDROAROMATIC CARBOXYLIC ACIDS

No Drawing. Application filed January 3, 1931, Serial No. 506,487, and in Germany January 11, 1930.

Our invention refers to the production of hydroaromatic carboxylic acids. As it is well known aromatic carboxylic acids are hydrogenated only with difficulty. We have found that aromatic carboxylic acids and their derivatives as for instance their hydroxy or amino-derivatives can easily and with good yield be transformed into the corresponding hydroaromatic acids by treating in form of their salts especially their alkali salts with hydrogen in aqueous solution and in the presence of a hydrogenation catalyst.

As hydrogenation catalysts can be used the well known nickelcatalysts or mixed catalysts consisting of nickel, cobalt, copper, which may be precipitated on a carrier.

The limits of the temperature at which the reaction occurs, are between 150° C. and 250° C.

A hydrogen pressure of 20–25 atm. will be sufficient, but there is no limit to higher pressures and also a pressure of 150 atm. can be applied.

*Example 1.*—A solution of 500 g. phthalic acid and 120 g. caustic soda in 2.5 lit. water is heated in an autoclave under a hydrogen pressure of 25 atm. to about 160° in the presence of a nickelcatalyst which may be prepared by reducing nickelhydroxide, which is precipitated on a carrier, with hydrogen at a temperature of about 400° C. The reaction occurs with generation of heat, which ceases after the reaction is performed. After cooling, the catalyst is filtered off and the transhexahydrophthalic acid is precipitated by adding a mineral acid. There are obtained 500 g. transhexahydrophthalic acid, which melts at 213–215° C.

*Example 2.*—An aqueous solution of 260 g. of sodium naphthalate are treated with hydrogen under a pressure of 25 atm. at a temperature of about 200° C. in the presence of 15 g. of a nickelcatalyst. The hydrogen is rapidly absorbed until 4 atoms hydrogen are taken up by 1 molecule naphthalate. By working up according to Example 1, 220 g. tetrahydronaphthalic acid are obtained, which melts at 184–187° C.

*Example 3.*—A 10 percentic solution of 300 g. of sodium naphthoylbenzoate are treated with hydrogen under a pressure of 25 atm. at a temperature of 180–200° C. in the presence of 15 g. of a previously reduced nickelcatalyst which is precipitated on a carrier. By working up according to Example 1 there are obtained a mixture of the several stereoisomeric perhydronaphthylmethylcyclohexane carboxylic acids.

*Example 4.*—175 g. of potassium m-hydroxybenzoate are treated in aqueous solution with hydrogen under pressure at a temperature of about 230° C. in the presence of 10 g. of a nickelcatalyst. By working up according to Example 1, 140 g. m-hydroxyhexahydrobenzoic acid are obtained.

Various changes may be made in the details disclosed in the foregoing specification without departing from the invention or sacrificing the advantages thereof.

We claim:—

1. The process for the production of hydroaromatic carboxylic acids by treating the metal salts of aromatic carboxylic acids in aqueous solution at temperatures from 150° C. to 250° C. with hydrogen in the presence of a nickel catalyst.

2. The process for the production of hydroaromatic carboxylic acids by treating the alkali salts of aromatic carboxylic acids in aqueous solution at temperatures from 150° C. to 250° C. with hydrogen in the presence of a nickel catalyst.

3. The process for the production of trans hexahydrophthalic acid by treating an alkali phthalate in aqueous solution at temperatures from 150° C. to 250° C. with hydrogen in the presence of a nickel catalyst.

4. The process for the production of tetrahydronaphthalic acid by treating an alkali naphthalate in aqueous solution at temperatures from 150° C. to 250° C. with hydrogen in the presence of a nickel catalyst.

5. The process for the production of m-hydroxyhexahydrobenzoic acid by treating an alkali m-hydroxybenzoate with hydrogen in aqueous solution at temperatures from 150° C. to 250° C. in the presence of a nickel catalyst.

ERWIN SCHWENK.
HANS JORDAN.